(No Model.)
L. V. POOLE & O. E. WILLIAMS.
TOOL FOR MAKING BEADINGS OR MOLDINGS.
No. 313,617. Patented Mar. 10, 1885.
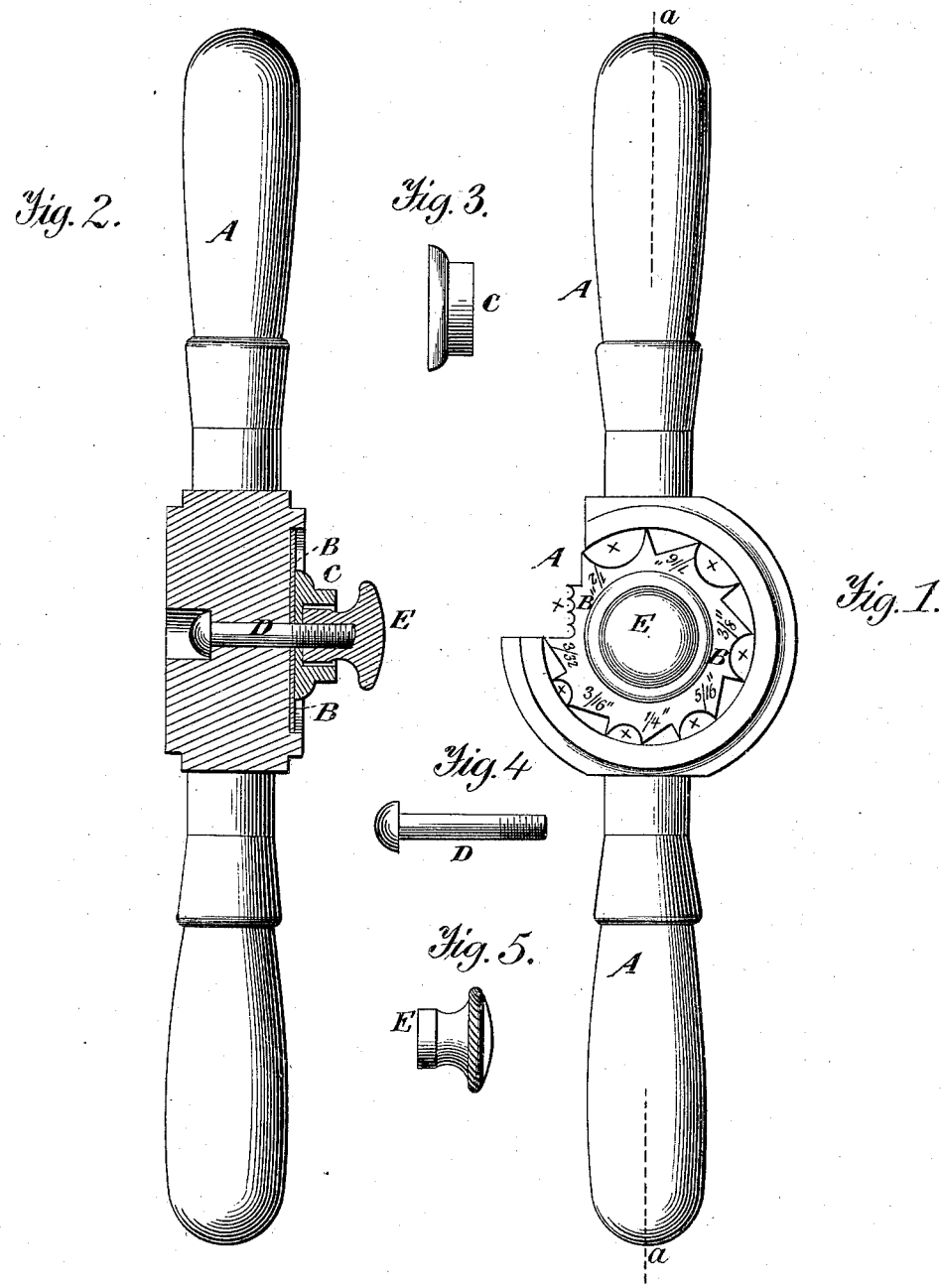
Witnesses.
Inventors.
L. V. Poole & O. E. Williams
Per
Thomas P. Simpson
Attorney

UNITED STATES PATENT OFFICE.

LAWRENCE V. POOLE AND ORLANDO E. WILLIAMS, OF WINDSOR, VERMONT.

TOOL FOR MAKING BEADINGS OR MOLDINGS.

SPECIFICATION forming part of Letters Patent No. 313,617, dated March 10, 1885.

Application filed November 28, 1884. (No model.)

*To all whom it may concern:*

Be it known that we, LAWRENCE V. POOLE and ORLANDO E. WILLIAMS, citizens of the United States, residing at Windsor, in the county of Windsor and State of Vermont, have invented a new and useful Tool for Making Beadings or Moldings, and that, according to our knowledge and belief, the same has not been in public use or on sale in the United States for more than two years prior to this application, and that the following is a specification thereof.

The objects of our invention are, first, to provide a means for making beadings or moldings on wood or other materials of different shapes and sizes with the same tool; second, to provide facilities for the proper adjustment and manipulation of the cutting-plate by which the beadings or moldings are formed. Work can be done with this tool, which now requires an expensive set of planes, and beadings or moldings can easily be formed on irregular surfaces where it is not practicable to do such work with the planes now used for such purposes. We attain these objects by the mechanism illustrated in the accompanying drawings, in which—

Figure 1 is a view in elevation of the tool ready for use. Fig. 2 is a section of the tool on the line *a a*, showing its parts. Fig. 3 is a view of the washer shown at C. Fig. 4 is a view of the screw shown at D. Fig. 5 is a view of the nut shown at E.

Similar letters refer to similar parts throughout the several views.

A A is a handle or stock, made of wood or metal, and which may be made to be used with one hand or both, to which the cutting-plate B is attached by the screw D, nut E, and washer C.

A' is a notch or recess in the body of the stock A A, to which the form of cutter desired to be used is turned when the tool is used.

B B is a cutting-plate, made of metal, which may be round, square, or many-sided, as desired, by which the beadings or moldings are formed, the various shapes of beadings or moldings desired being cut into the edge of the plate, as shown at the points marked X.

C is a washer, of metal, placed between the nut E and plate B, for the purpose of giving a firm bearing on the plate B. This washer may be dispensed with, if desired, and the bearing made directly by the thumb-screw E.

D is a screw passing through the handle A A, plate B, and washer C into the nut E.

E is a nut working on the screw D, by which the plate B is held in the position desired.

The tool is used in much the same manner as an ordinary shave or scraper; the form on the plate B which it is desired to make, having been placed in position at the recess A', is pressed firmly onto the wood or metal where the bead or molding is desired, and worked back and forth till the bead or molding is cut to the desired depth.

We are aware that prior to our invention beadings or moldings have been cut by plates of metal in the edge of which the shape desired had been cut; and we do not therefore claim broadly the invention of that manner of making beadings or moldings; but What we do claim as our invention, and desire to secure by Letters Patent, is—

1. In a hand-beader, the tool-stock perforated centrally for a screw-clamp, having the tool-seat around said perforation, and provided with an angular recess; A', the latter arranged in a plane at right angles to the plane of the seat, as shown, and for the purpose described.

2. A hand-beader having two diametrically-opposite handles, an intermediate centrally-perforated stock provided with recess A', and a suitable screw-clamp, the tool-seat being arranged around said perforation, as shown, and for the purpose set forth.

LAWRENCE V. POOLE.
ORLANDO E. WILLIAMS.

Witnesses:
URIEL L. COMINGS,
WM. BATCHELDER.